US012608361B1

(12) United States Patent
Ashkenazi et al.

(10) Patent No.: US 12,608,361 B1
(45) Date of Patent: Apr. 21, 2026

(54) SORTED DATABASE TABLE

(71) Applicant: VAST DATA LTD., Tel Aviv (IL)

(72) Inventors: Oren Ashkenazi, Tel Aviv (IL); Vlad Zdornov, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

(21) Appl. No.: 19/040,843

(22) Filed: Jan. 29, 2025

(51) Int. Cl.
G06F 16/22 (2019.01)
G06F 16/215 (2019.01)
G06F 16/28 (2019.01)

(52) U.S. Cl.
CPC ........ *G06F 16/2282* (2019.01); *G06F 16/215* (2019.01); *G06F 16/288* (2019.01)

(58) Field of Classification Search
None
See application file for complete search history.

(56) References Cited

U.S. PATENT DOCUMENTS 10,268,726 B1 * 4/2019 Schiesser ............ G06F 16/2282
2012/0254199 A1 * 10/2012 Kuno ........................ G06F 7/32
707/752

2014/0281194 A1 * 9/2014 Gaertner ............... G06F 3/0613
711/105
2014/0324890 A1 * 10/2014 Caufield ................... G06F 7/36
707/752
2018/0260440 A1 * 9/2018 White ............... G06F 16/24542
2019/0317727 A1 * 10/2019 Antonopoulos ...... G06F 3/0604
2023/0376473 A1 * 11/2023 Amler ............... G06F 16/24556
2025/0165897 A1 * 5/2025 Boker ................. G06F 16/2365

* cited by examiner

*Primary Examiner* — Richard L Bowen
(74) *Attorney, Agent, or Firm* — Reches Patents

(57) ABSTRACT

A method for updating a partially ordered database, the method includes (a) obtaining, by a merge circuit, density values of multiple sorted table chunks of the partially ordered database, wherein a density value of each sorted table chunk is indicative of a relationship between a number of populated rows of the sorted table chunk and a width of the sorted table chunk, wherein the width of the sorted table chunk is determined based on (i) values of sort keys of the sorted table chunk, and (ii) a parameter of a distribution of values of sort keys of the partially ordered database; each sort key is associated with a row of a table of the partially ordered database and represents values of multiple cells of the row; (b) merging, by the merge circuit, a set of sorted table chunks to provide a new sorted table chunk that exhibits a density value that exceeds a density value of each sorted table chunk of the set; and (c) replacing, in a storage unit of a storage system, the set of sorted table chunks by the new sorted table chunk.

21 Claims, 5 Drawing Sheets

Landing table 140

130(1)
130(2)
130(3)
130(4)
130(5)

STC 110(1)

Chunk pool 120

STC 110(5)

STC 110(2)

STC 110(3)

STC 110(4)

100

| Row 110(3,1) | Key 111(3,1) |
| Row 110(3,2) | Key 111(3,2) |
| Row 110(3,3) | Key 111(3,3) |
| Row 110(3,4) | Key 111(3,4) |
| Row 110(3,5) | Key 111(3,5) |
| Row 110(3,3) | Key 111(3,3) |
| Row 110(3,4) | Key 111(3,4) |
| Row 110(3,5) | Key 111(3,5) |

Figure 3:
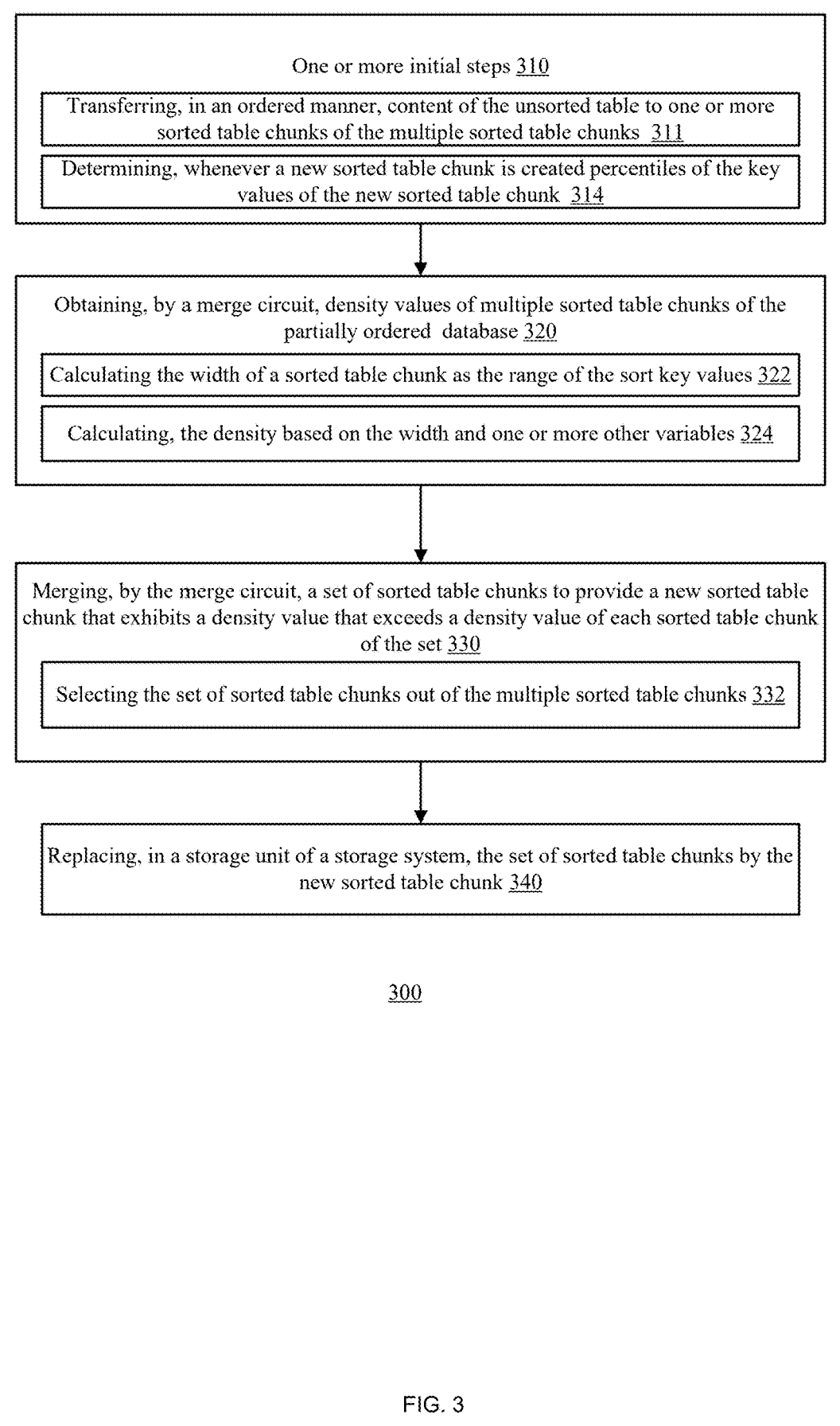

One or more initial steps 310

Transferring, in an ordered manner, content of the unsorted table to one or more sorted table chunks of the multiple sorted table chunks 311

Determining, whenever a new sorted table chunk is created percentiles of the key values of the new sorted table chunk 314

Obtaining, by a merge circuit, density values of multiple sorted table chunks of the partially ordered database 320

Calculating the width of a sorted table chunk as the range of the sort key values 322

Calculating, the density based on the width and one or more other variables 324

Merging, by the merge circuit, a set of sorted table chunks to provide a new sorted table chunk that exhibits a density value that exceeds a density value of each sorted table chunk of the set 330

Selecting the set of sorted table chunks out of the multiple sorted table chunks 332

Replacing, in a storage unit of a storage system, the set of sorted table chunks by the new sorted table chunk 340

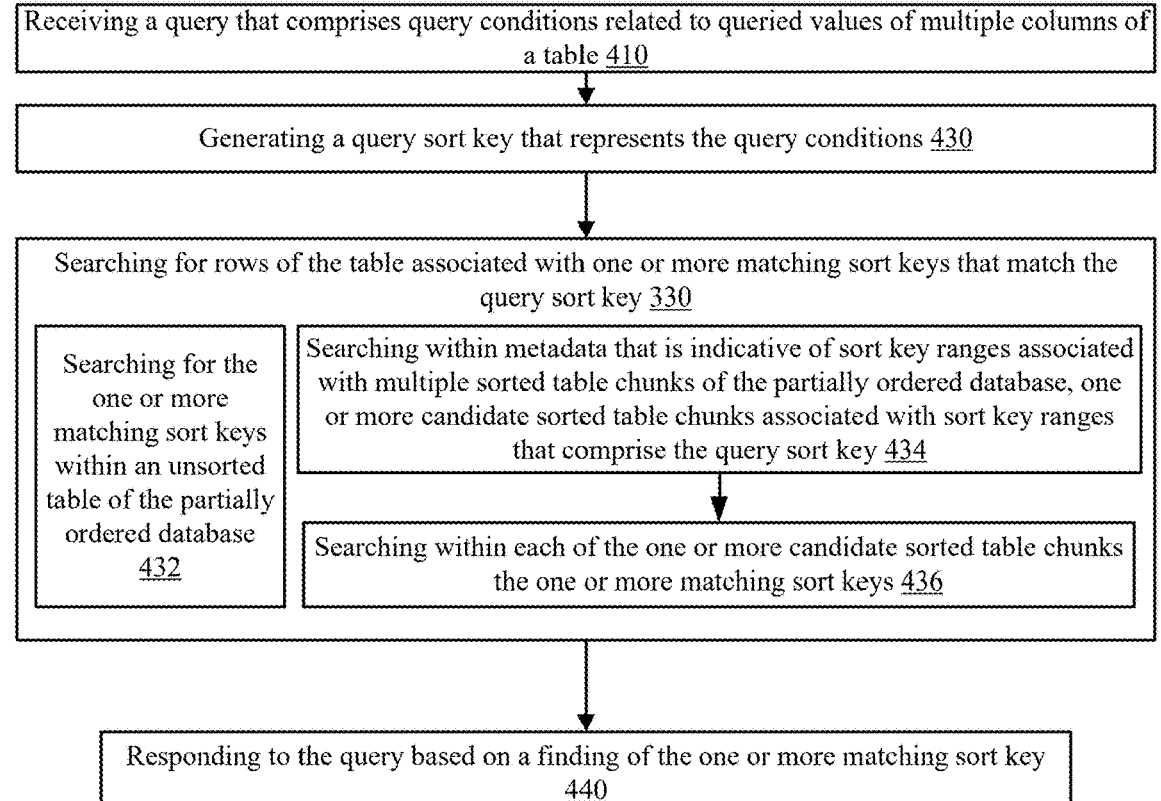

Receiving a query that comprises query conditions related to queried values of multiple columns of a table 410

Generating a query sort key that represents the query conditions 430

Searching for rows of the table associated with one or more matching sort keys that match the query sort key 330

Searching for the one or more matching sort keys within an unsorted table of the partially ordered database 432

Searching within metadata that is indicative of sort key ranges associated with multiple sorted table chunks of the partially ordered database, one or more candidate sorted table chunks associated with sort key ranges that comprise the query sort key 434

Searching within each of the one or more candidate sorted table chunks the one or more matching sort keys 436

Responding to the query based on a finding of the one or more matching sort key 440

SORTED DATABASE TABLE

BACKGROUND

Database systems support queries for retrieving content from tables according to certain predicates, wherein a predicate includes one or more search conditions on one or more columns of a table. When a certain predicate is frequently being used by queries, it is advantageous to sort the table according to a certain order that involves columns addressed by the frequently used predicate.

LSM (Log Structured Merge) tree is a technique used for maintaining partially sorted structures. LSM trees organize data into multiple levels, where lower levels include increasingly larger, sorted data buffers. A merge process periodically consolidates sorted data buffers into larger buffers under lower layers, until merging all buffers into a huge monolithic sorted buffer.

When tables are stored in SSDs (Solid State Drives) devices, where wear out caused by write amplification should be considered, there is a need to avoid merges with low contribution to the efficiency of responding to queries, and further to provide an efficient sorting mechanism of a database table, while simplifying the merging which is the heavy-lifting part of the sort process, particularly, in a write-heavy workload system.

SUMMARY

There may be provided a method, a system, and a non-transitory computer readable medium as illustrated in the application.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

FIG. 3 is an example of a method;

FIG. 4 is an example of a method; and

DETAILED DESCRIPTION OF THE DRAWINGS

Figure 1:
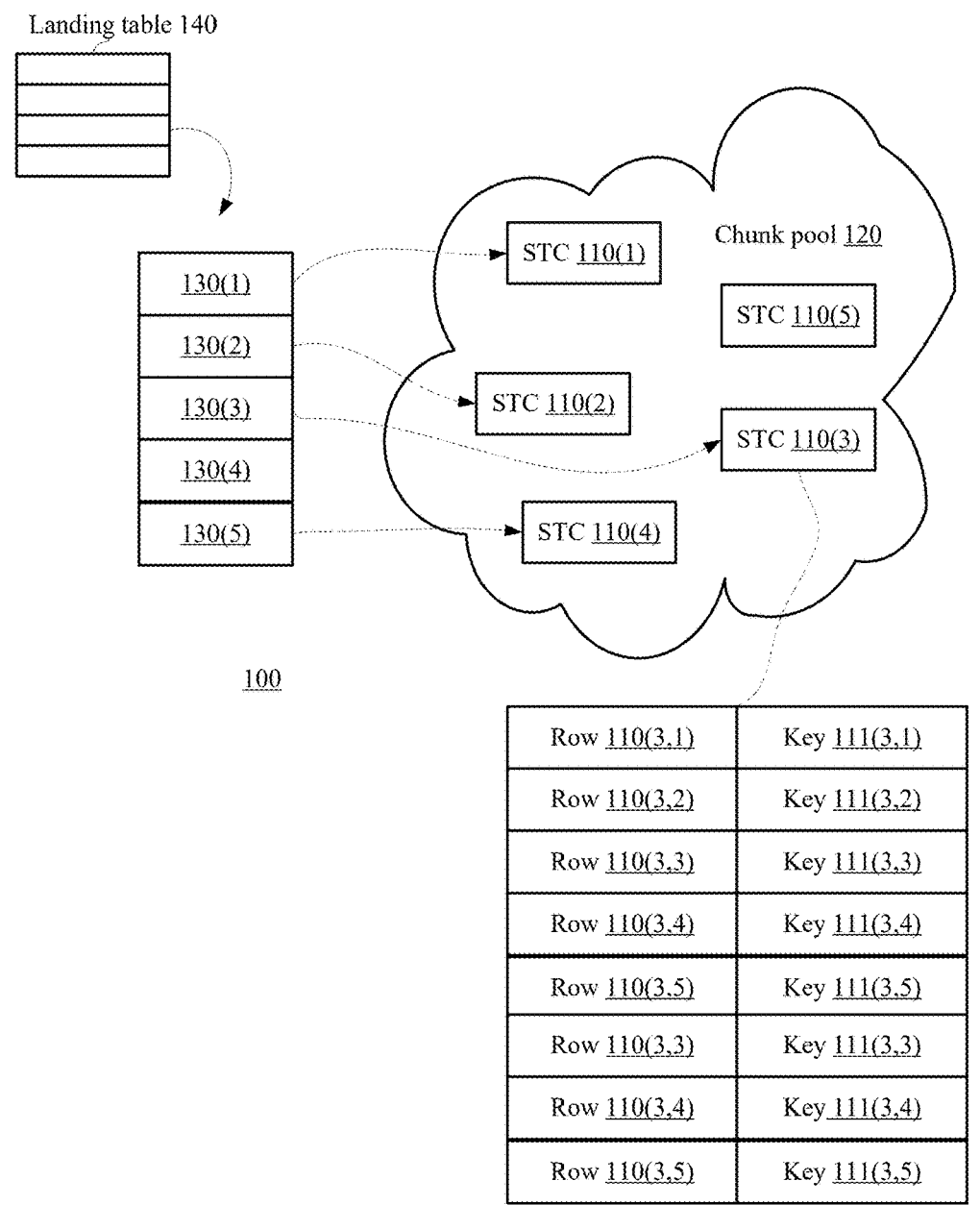
FIG. 1 is an example of a partially ordered database table.

A storage system organizes an ordered database table as multiple sub-tables. The ordered database table is also referred to as partially ordered database table, though most of the table is ordered and only a small portion is not ordered, as will be described herein. The multiple sub-tables include a landing table and a pool of sorted table chunks, all have the same column format, which is similar to the format of the ordered database table, as defined by the user. Each sorted table chunk includes different rows of the whole table. The landing table serves as an initial dropping off point for incoming data and includes unsorted ingest data (data as received from a user, before being sorted). The landing table stores a limited number of unsorted rows. The sorted table chunks are also organized in a tabular manner and have the same column format as the landing table. Sort background processes, constantly or periodically, pull data from the landing table, re-order the data and insert the sorted data as sorted table chunks into the pool. The frequency of pulling data from the landing table is high enough, so as to keep the landing table with only a small number of rows compared to the total number of rows, e.g., the number of rows in the landing table may be limited to 10%, 1%, or less of the total number of rows in the entire ordered database table.

The sorted table chunks in the pool are initially created by removing a group of rows (or all the rows) from the landing table, sorting the group of rows according to a sort key, and moving the group of rows, as one or more sorted table chunks, into the pool. The maximum size of a sorted table chunk is capped by a pre-defined value limiting the number of rows and/or the amount of data in one sorted table chunk, e.g., 10M rows or 10 GB of data. For example, if the entire database table include 1 tera rows, there will be 100K sorted table chunks in the pool.

A merging process periodically selects multiple sorted table chunks from the pool, according to a selection algorithm described hereinafter, and merges the selected sorted table chunks. The merging algorithm considers at least a density of the sort keys of the candidate sorted table chunks, and the extent of overlapping key ranges among sorted table chunks selected for merging.

The key that defines the sorting may be defined by a user of the storage system, as a set of columns and the order of the columns that define the sort key. The sort key may be also defined by the system when detecting that a certain predicate, which includes conditions involving certain columns in a certain order—is frequently being used. The sort key for each row may be calculated by concatenating the values of the relevant columns from the most to the least significant column requested to be sorted. The sort key of the rows may be stored as a separate column, upon which the lookup is performed when responding to a query. The sorting enables a binary search upon looking up requested values, and can improve the queries response time for queries that have AND-type predicate on all sort key columns (column participating in the sort), or at least on a subset of the sort key columns.

FIG. 1 illustrates an ordered database table 100, that includes a landing table 140 and a chunk pool 120. Chunk pool 120 includes multiple sorted table chunks (STCs) 110(1)-110(5). Each sorted table chunk has a table format having the same column format as landing table 140 and as the other sorted table chunks 110, and includes multiple rows out of the entire rows of the ordered database table, see for example sorted table chunk 110(3) illustrated as having multiple rows 110(3,1)-110(3, 8). The multiple rows of each sorted table chunk are sorted according to sort keys associated with the multiple rows. For example, row 110(3,1) of sorted table chunk 110 is associated with key 111(3,1), row 110(3,8) is associated with key 111(3,8), etc. The keys represent values under the columns (sort columns) that dictate the sorting and may be a concatenation or other combination of values in the junctions of the respective rows and sort columns.

The landing table will be populated in the following cases: (i) when a new row is inserted by a user, the new row will be added to the landing table; (ii) when a user requests to transform an unordered database table to an ordered database table, in this case, the entire original database table becomes the landing table; (iii) when an update of a row is requested, and a change is identified in a field under a column that is part of the columns that compose the sort key. In this case, the row will be removed from its sorted table chunk in the pool and will be added to the landing table. The sorted table chunk now includes a deleted row (a hole) instead of the row that was relocated to the landing table. As rows are being deleted, the corresponding sorted table chunk becomes sparse.

Each sorted table chunk is associated with the following characteristics: (i) the range of the sort key values (minimum and maximum value boundaries), (ii) the size of the sorted table chunk, measured in number of rows (or number of bytes), and (iii) a density level.

A data structure that implements a pool index 130 includes an entry for each sorted table chunk in the pool, such as entries 130(1)-130(5), that includes the characteristic of the sorted table chunk (density level, number of rows, range of sort key values), and a reference (e.g., pointer illustrated as a dashed arrow) to the corresponding sorted table chunk. The pool index 130 is used for locating sorted table chunks that are relevant to a received query for retrieving content according to a requested key. The pool index 130 is also used by the merger process, for selecting the most suitable sorted table chunks to be merged.

According to an embodiment, the density level is regarded as locality of keys in a sorted table chunk, and is based on a width W of the range of the sort key values of the sorted table chunk, and the number of rows. The width of a sorted table chunk may be defined as the range of the sort key values or in other words, the distance between the minimum and the maximum of the range—if a uniform distribution of the keys is assumed. In a case of a non-uniform distribution of the key values across the key range, the non-uniformity can be considered when calculating the width and the density. A non-uniform distribution may be sometime significant, for example, 50% of the rows have the same key while other row keys are distributed across other values.

To consider non-uniformity, the width associated with each sorted table chunk is calculated by comparing the key range of the sorted table chunk to the distribution percentiles of the entire table, or at least the distribution percentiles of all the sorted table chunks.

Whenever a new sorted table chunk is created (either as part of a merge or when relocated from the landing table), percentiles of the key values of the new sorted table chunk—are calculated and stored in the entry describing the sorted table chunk in the pool index. The key values percentiles of the new sorted table chunk are combined with the percentiles of all existing sorted table chunks to construct a histogram of the keys in the entire table (or at least at the sorted part of the table).

The width of a sorted table chunk, W (ranged between 0 to 1), is defined as the relative part of the key range out of the total distribution, as reflected by the histogram of the entire table. For example, given the following histogram percentiles of the entire table, for key values zero to four-value 0 appears 10%, value 1 appears 30%, value 2 appears 5%, value 3 appears 45%, and value 4 appears 10% (i.e., 10% of the keys have the value '0', 30% have the value '1', etc.), and given a sorted table chunk that covers the key range 1-3, then it will have a width of W=0.8 (30%+5%+45%).

Given a sorted table chunk with Crows, the density D is defined by D=C/(W*B), wherein B is the number of rows of a new sorted table chunk, when extracted from the landing table, and is used for normalizing purpose. D=1—is the minimal density of a new sorted table chunk (C=B), when the sorted table chunk covers all the key range. D can be smaller than 1, when there are deleted rows (holes).

The result density of a merge, D, of the output sorted table chunks, should be higher than the density of the input sorted table chunks before the merge. Having a broader overlap will result in higher improvement.

According to an embodiment, the density is any other function that reflects the relationship between C and W. Example of a First Sorted Table Chuck:

| KEY | Other fields |
| --- | --- |
| 1000 | |
| 2000 | |
| 3000 | |
| 5000 | |
| 7000 | |
| 9000 | |
| 10000 | |

Example of a Second Sorted Table Chuck:

| KEY | Other fields |
| --- | --- |
| 1000 | |
| 1010 | |
| 1020 | |
| 1021 | |
| 1022 | |
| 1023 | |
| 1024 | |

The keys of the first and second sorted table chuck include: 1000, 1000, 1010, 1020, 1021, 1022, 1023, 1024, 2000, 3000, 5000, 7000, 9000 and 10000. The rows (that include the keys and the other fields) are sorted accordingly. The Key Percentiles:

a. There are 9 key values within the range of 1000-2000-60 percent.

b. There are 2 key values within the range of 2001-3000-13 percent.

c. There is a single key value within the range of 4001-5000-7 percent.

d. There is a single key value within the range of 6001-7000-7 percent.

e. There is a single key value within the range of 8001-9000-7 percent.

f. There is a single key value within the range of 9001-10000-7 percent.

The width of the first sorted table chunk is one (it spans across all populated ranged), and its density is 7 (seven rows divided by a density having the value '1').

The width of the second sorted table chunk is 0.6 (since it includes only keys within the range of 1000-2000 that covers 60% of the keys), and its density is 12 (seven rows divided by a density of 0.6). Therefore, it can be determined that the second table chunk is denser than the first table chunk, or in other words, the first table chunk is sparser than the second table chunk. The first and second table chunks may belong to different density levels.

The merging process aims to produce denser sorted table chunks, by combining, in a sorted manner, multiple R sorted table chunks into a denser sorted table chunk. In order to obtain denser sorted table chunks, the merger process aims to combine: (i) sorted table chunks having largest extent of overlapping ranges, (ii) sorted table chunks of a similar density level.

Figure 2:
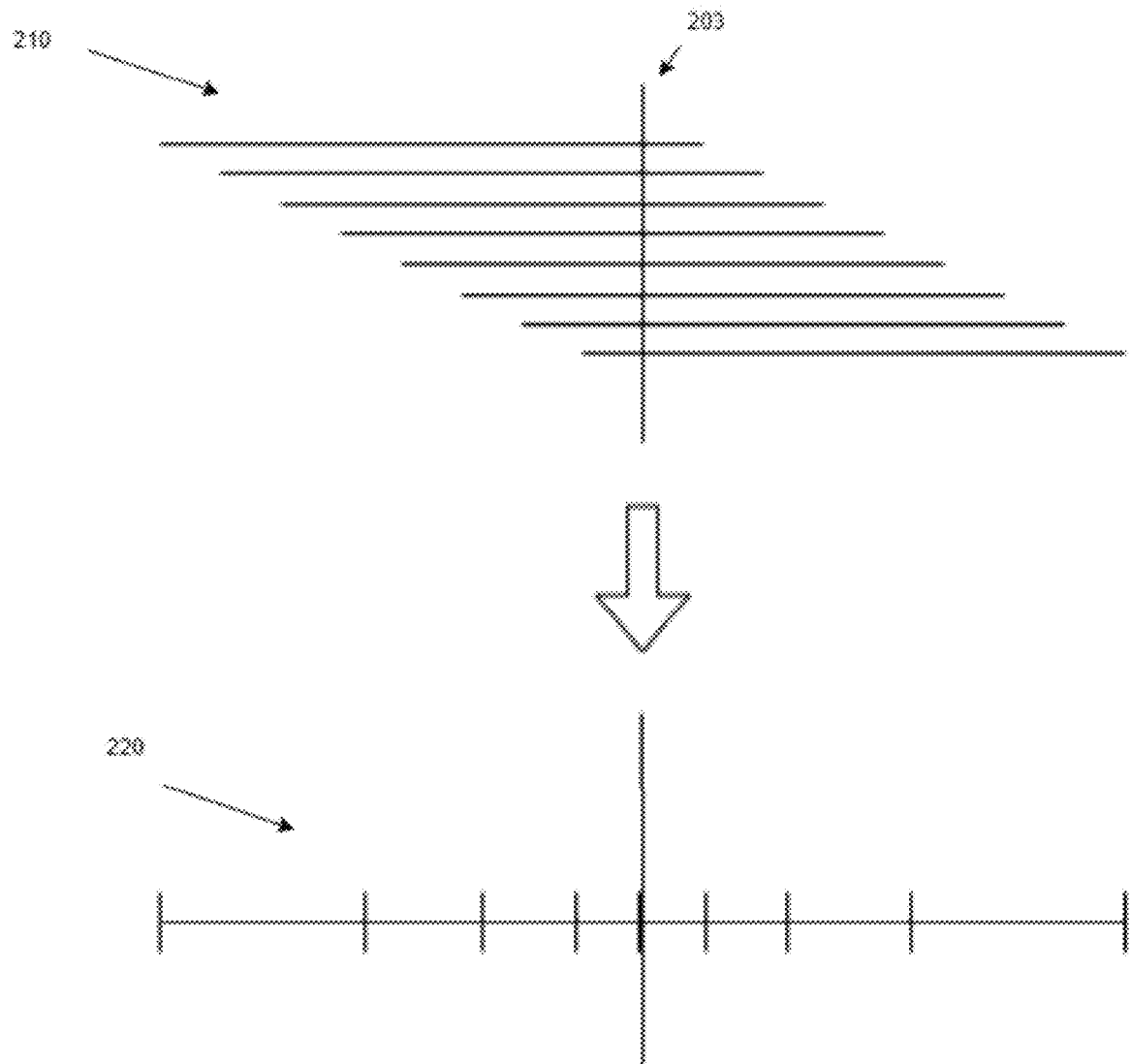
FIG. 2 is an example of an overlapping of selected sorted table chunks.

The overlapping 210 of e.g., 8 selected sorted table chunks is illustrated in FIG. 2. All share a key range centered at point 203. The result 220 of the merge illustrates the key range of the new sorted table chunk and the density across the key range, wherein the values around the center of the overlapping are denser, and the dense is reduced at the edges.

Suppose R overlapping sorted table chunks of same density are merged, the density level of the result is up to R times higher than the original density level. Choosing sorted table chunks, having the same density level, ensures that the average density of the sorted table chunks in the merge result is sufficiently higher than the original sorted table chunks, up to R times denser around the overlap centre point. Therefore, choosing sorted table chunks of same density level and high extent of overlapping assures achieving higher density.

When determining whether to merge certain sorted table chunks, there are two performance properties to be considered. The first one is a write amplification that will be caused by the rewrite of rows of the merged sorted table chunks. On the other hand, multiple sorted table chunks with overlapping ranges will require performing multiple binary searches, one binary search per each relevant sorted table chunk.

The merger process avoids merging sorted table chunks of different density levels, even if the two chunks share a significant extent of overlapping (e.g., 30%, 50%, 80%), or even if they completely overlap, because merging a dense sorted table chunk with a sparse sorted table chunk will not result in a sufficient improvement of the density of the denser table chunk, that justifies the extra writes to the SSD that cause unnecessary wear out of the SSD.

The merger will prioritize merging sorted table chunks of lower density levels, because the goal is to increase density as much as possible, and because the cost of rewrite is low, since less rows are involved.

In addition to the above conditions for merging, the merging will prefer selecting sorted table chunks having holes caused by deleted rows.

The number of merges that will be performed as part of a merging cycle will be dependent on the system workload. Under a low workload, more merges will be performed than merges that run under a higher workload.

A query that includes a predicate that matches the sort key is a query that includes conditions on columns that participate in the sort key, according to the sort order, wherein the query indicates either all the columns involved in the sort key or at least the most significant columns (the first columns in the sort order). When such a predicate is detected in a received query, the following parts of the ordered database table will be looked up: (i) the unordered rows of the landing table will be scanned in a serial manner for obtaining relevant rows that have column values that much the conditions, (ii) the pool index will be looked up for locating relevant sorted table chunks having a range of sort key values (according to the minimum and maximum values) that overlaps with values indicated in the predicate, (iii) the sorted rows of the relevant sorted table chunks will be looked up using a binary search (also known as half-interval search and logarithmic search) that runs in logarithmic time.

The sort key, which is created by concatenating the key columns, can be very large, especially when some of the columns involved in the key can be strings. In a case where the resulted sort keys exceed a certain length limit, e.g., 128B, 1 KB, etc., one of two types of truncation policy can be applied for truncating the sort keys: (i) MSB (most significant bytes) first—where only the first bytes of the concatenated key are used as the sort key, while values of some of the least significant columns are dropped. This approach can be used when a major part of the received queries includes a predicate that includes conditions for the first (most significant) columns only; (ii) inclusive—the concatenated sort key includes at least a minimum number of bytes from each column. The chosen truncation policy can be configurable upon table creation.

FIG. 3 illustrates method 300 for updating a partially ordered database.

According to an embodiment, method 300 starts by one or more initial steps collectively denoted 310.

According to an embodiment, one or more initial steps 310 are followed by step 320 of obtaining, by a merge circuit, density values of multiple sorted table chunks of the partially ordered database. A density value of each sorted table chunk is indicative of a relationship between a number of populated rows of the sorted table chunk and a width of the sorted table chunk.

According to embodiment, the width of the sorted table chunk is determined based on (i) values of sort keys of the sorted table chunk (or the range of the sort keys), and (ii) a parameter of a distribution of values of sort keys of the partially ordered database. The width can be also regarded as the portion of the range of the sort keys of the sorted table chunk out of the total key range of the partially ordered database, and if non-uniformity is considered, then the portion is calculated by taking into account the weight (percentage of keys in the sub-range) of each key sub-range of the partially ordered database.

According to embodiment, each sort key is associated with a row of a table of the partially ordered database and represents values of multiple cells of the row. The sort key can be included in the row, wherein all the keys of all the rows form a separate column.

According to an embodiment, the density level is regarded as locality of keys in a sorted table chunk, and is based on a width W of the range of the sort key values of the sorted table chunk, and the number of rows.

According to an embodiment, step 320 includes step 322 of calculating the width of a sorted table chunk as the range of the sort key values of the sorted table chunk.

According to an embodiment, when the sort key values are uniformly distributed—step 322 includes calculating the width based on the relation between the key range of the sorted table chunk and the key range of the entire partially ordered database (or at least the range of all the sorted table chunks), wherein the key range of the sorted table chunk is the distance between the values of the minimum sort key and the maximum sort key of the sorted table chunk.

According to an embodiment, when the sort key values are uniformly distributed—step 322 includes calculating the width also based into account the distribution of the key values.

According to an embodiment, in a case of a non-uniform distribution of the key values across the key range of the partially ordered database, step 322 includes calculating the width based on non-uniformity. A non-uniform distribution may be sometime significant, for example, 50% of the rows have the same key while other row keys are distributed across other values.

According to an embodiment, in a case of a non-uniform distribution of the key values across the key range, step 322 includes calculating the width by comparing the key range of the sorted table chunk to the distribution percentiles of the entire table, or at least the distribution percentiles of all the sorted table chunks. The distribution percentiles refer to the weight (in percentage) of each sub-range of the sort keys.

According to an embodiment, the one or more initialization steps include step 314 of determining, whenever a new sorted table chunk is created (either as part of a merge or when relocated from the landing table), percentiles of the key values of the new sorted table chunk—and optionally storing the percentiles in the entry describing the sorted table chunk in the pool index.

According to an embodiment step 314 also include combining the key values percentiles of the new sorted table chunk with the percentiles of all existing sorted table chunks to construct a histogram of the keys in the entire table (or at least at the sorted part of the table).

According to an embodiment, step 322 includes calculating the width of a sorted table chunk, W (ranged between 0 to 1), as the relative part of the key range out of the total distribution, as reflected by the histogram of the entire table.

For example, given the following histogram percentiles of the entire table:

a. Key value 0-10% of the key values.

b. Key value 1-30% of the key values.

c. Key value 2-5% of the key values.

d. Key value 3-45% of the key values.

e. Key value 4-10% of the key values.

f. Given a sorted table chunk that covers the key range 1-3, then it will have a width of W=0.8 (30%+5%+ 45%).

g. Given a sorted table chunk that covers key range 0-1, then it will have a width of W=0.4 (30%+10%).

According to an embodiment, step 320 also includes step 324 of calculating, given a sorted table chunk with C rows, the density D by D=C/(W*B), wherein B is the number of rows of a new sorted table chunk, when extracted from the landing table, and is used for normalizing purpose. D=1—is the minimal density of a new sorted table chunk (C=B), when the sorted table chunk covers all the key range. D can be smaller than 1, when there are deleted rows (holes).

According to an embodiment, the density is any other function that reflects the relationship between C and W. For example—the density is not based on B.

According to embodiment, step 320 is followed by step 330 of merging, by the merger circuit, a set of sorted table chunks to provide a new sorted table chunk. In a case where the merging produces a chunk that is larger than a size threshold (defined as maximum allowed rows or maximum allowed total size), the produced chunk is split into two or more new sorted table chunks that includes the new sorted table chunk.

According to an embodiment, the new sorted table chunk exhibits a density value that exceeds a density value of each sorted table chunk of the set.

According to an embodiment the merging occurs to result a density of a merge, D, of the output sorted table chunks, which is be higher than the density of the input sorted table chunks before the merge.

According to an embodiment step 330 includes avoiding merging a set of sorted table chunk if the outcome of the merging exhibits a density that does not exceed the density of any of the sorted table chunks of the set. For example, the merging is avoided for sorted table chunks of different density levels, or when the density values of two or more sorted table chunks deviate from each other by more than a threshold. The avoidance may be regardless of the extent of the overlapping of the key ranges, even when the sorted table chunks (of different density levels) have a broad overlapping. For example, in the example above of the first and second sorted table chunks, the key range (1000-1024) of the second sorted table chunk is entirely included in the key range (1000-10000) of the first sorted table chunk. However, their density levels are completely different (value of 1 versus 0.6), therefore these sorted table chunks are not candidates that participate in the same set to be merged.

According to an embodiment, having a broader overlap between sorted table chunks of the set will result in higher improvement of the density.

According to embodiment, the partially ordered database further includes an unsorted table (also referred to as landing table), and the one or more initial steps include step 311 of transferring, in an ordered manner, content of the unsorted table to one or more sorted table chunks of the multiple sorted table chunks.

According to an embodiment, the parameter of the distribution is indicative of a non-uniformity parameter of the distribution.

According to an embodiment, step 330 includes step 332 of selecting the set of sorted table chunks out of the multiple sorted table chunks.

According to an embodiment, the selecting precedes step 330.

According to an embodiment, step 332 includes at least one of:

a. Selecting the set of sorted table chunks to include sorted table chucks of a same (equal) density value.

b. Selecting sorted table chucks of density values within a single density level of multiple density levels associated with the sorted table chucks. According to an embodiment, the single density level includes density values that may deviate from each other by up to a threshold. According to an embodiment that threshold is less than one percent or between one and five or ten or twenty percent, and the like. Other thresholds may be defined by a user or system administrator, and the like.

c. Preventing from selecting sorted table chunks having density values that differ from density values of the sorted table chunks of the set by at least the threshold.

d. Selecting based on (a) density values of the sorted table chunks, and (b) overlaps between sort key ranges associated with the sorted table chunks.

Step 330 is executed by the merge circuit or by a processor other than the merger circuit. A merge circuit is at least a part of a processing circuit that is programmed to perform any of merging mentioned above.

According to embodiment, step 330 is followed by step 340 of replacing, in a storage unit of a storage system, the set of sorted table chunks by the new sorted table chunk, after the set is merged to provide the new sorted table chunk.

The replacing includes adding the new sorted table chunk and deleting the sorted table chunks of the set, wherein the adding and the deleting may be performed simultaneously or in a sequential order—for example the new sorted table chuck is stored and later on the set of sorted table chunks are deleted and/or the memory cells that stores them are identified as invalid or storing irrelevant data—and targeting these memory cells for reuse. When stored in a non-volatile memory—the one or more blocks that store the set of sorted table chunks may be erased once they do not include any relevant data.

FIG. 4 illustrates an example of method 400 for responding to a database query.

According to an embodiment, method 400 starts by step 410 of receiving a query that comprises query conditions related to queried values of multiple columns of a table.

According to an embodiment, step 410 is followed by step 420 of generating a query sort key that represents the query conditions.

According to an embodiment, step 420 is followed by step 430 of searching for rows of the table associated with one or more matching sort keys that match the query sort key. A matching key may be a key that is equal to the query sort key or within a range defined by the query sort key.

According to an embodiment, step 430 includes steps 432, 434 and 436. Said steps may be executed in a serial manner, in a parallel manner, and the like.

According to an embodiment, step 432 includes searching for the one or more matching sort keys within an unsorted table of the partially ordered database.

According to an embodiment, step 434 includes searching within metadata that is indicative of sort key ranges associated with multiple sorted table chunks of the partially ordered database (e.g., the pool index of FIG. 1), one or more candidate sorted table chunks associated with sort key ranges that comprise the query sort key.

According to an embodiment, step 436 includes searching within each of the one or more candidate sorted table chunks the one or more matching sort keys.

According to an embodiment, step 430 is followed by step 440 of responding to the query based on a finding of the one or more matching sort key.

According to an embodiment, the query is a read request, and a content associated with the query is outputted from the storage system to a user of the storage system. The response includes at least part of the content of each row that is associated with a matching sort key.

According to an embodiment, step 420 includes generating of the query sort key that represents the query conditions comprises concatenating the values of the multiple columns of the table.

According to an embodiment, the concatenating is made according to an order of sort significance of the columns. The sort significance indicate which column value is used as a primary sort key (used in a first sorting operation) and which column values are used for secondary sorting (for example sorting sets that share the same higher sort significant sort key).

According to an embodiment, a given sorted table chunk of the multiple sorted table chunks exhibits a density value that exceeds density value of each member of a set of sorted table chunks that were merged (prior to receiving the query) to provide the given sorted table chunk. An example of densities and said mentioned rule for merging is illustrated in method 300.

According to an embodiment, a given sorted table chunk of the multiple sorted table chunks is generated by merging a set of sorted table chunks that were selected based on their density values.

According to an embodiment, a density value of each sorted table chunk of the set is indicative of a relationship between a number of populated rows of the sorted table chunk and a width of the sorted table chunk, wherein the width of the sorted table chunk is determined based on (i) values of sort keys of the sorted table chunk, and (ii) a parameter of a distribution of values of sort keys of the partially ordered database.

According to an embodiment, the parameter of the distribution is indicative of a non-uniformity parameter of the distribution.

According to an embodiment, a given sorted table chunk of the multiple sorted table chunks is generated by executing method 300. For example—the given sorted table chunk is generated by:

a. Obtaining density values of a set of sorted table chunks, the set not belonging to the multiple sorted table chunks, wherein a density value of each sorted table chunk of the set is indicative of sort key values of at least the sorted table chunk. The set does not belong to the multiple sorted table chunks because they were replaced by the given sorted table chunk. While the multiple sorted table chunks are searched during a first point in time (in which the sorted table chunk exists), the merging of the set occurred at a previous point of time- and the set was already replaced by the sorted table chunk.

b. Merging the set of sorted table chunks to provide the given sorted table chunk that exhibits a density value that exceeds a density value of each sorted table chunk of the set. The merging preserves the order of the sort keys.

c. In a case where the merging the set of sorted table chunks produces a chunk that is larger than a size threshold, the produced chunk is divided into two or more new sorted table chunks that include the given sorted table chunk, wherein each of the new sorted table chunks have a size that does not exceed the size threshold.

Figure 5:
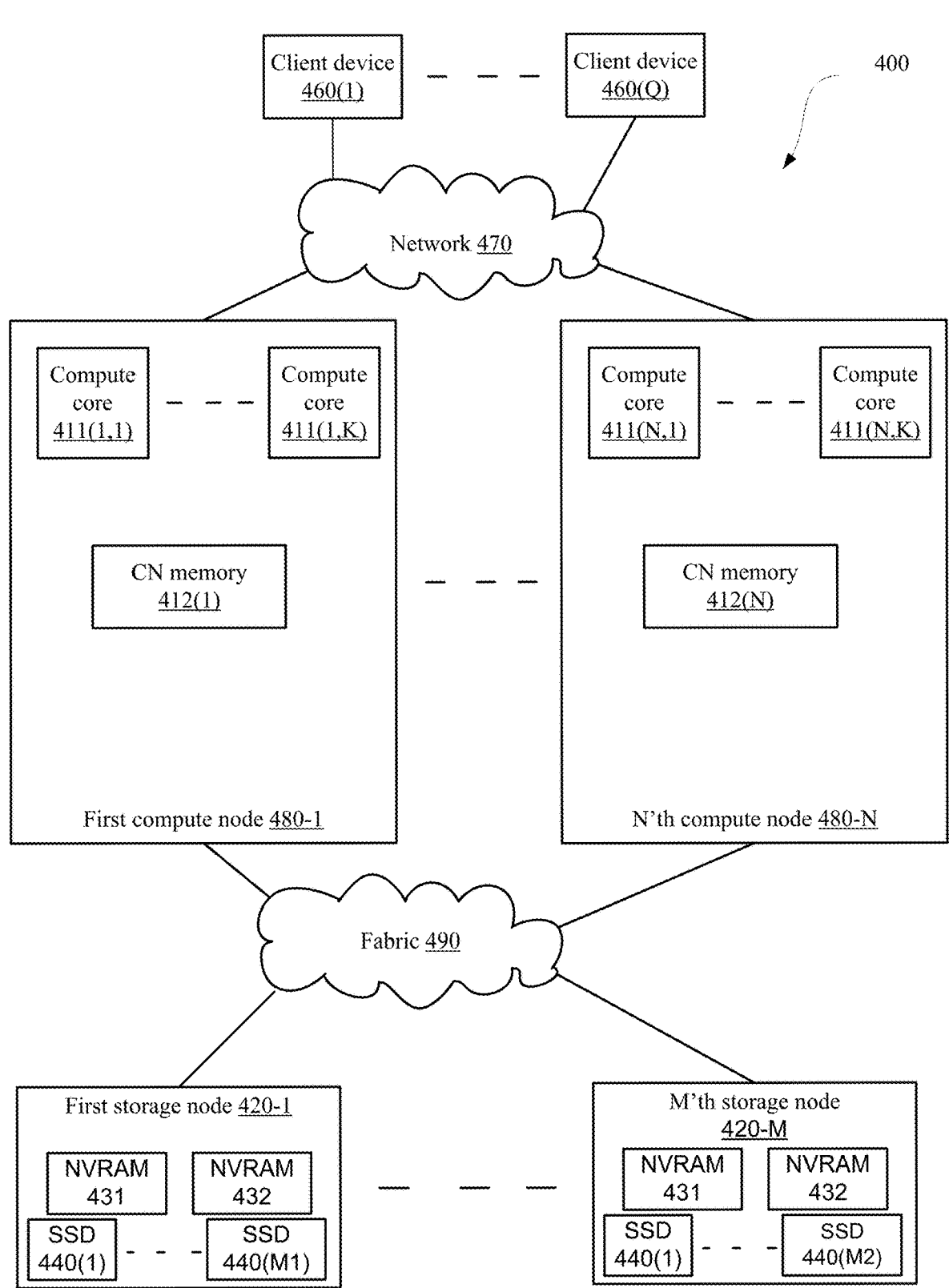
FIG. 5 is an example of a storage system.

FIG. 5 shows an example diagram of a storage system 400 for managing a partially ordered database. The storage system 400 includes N compute nodes—from first compute node 480-1 through the N'th compute node 480-N.

Each compute nodes includes multiple compute cores each—see for example compute cores 411(1,1)-411(1,K) of first compute node 480-1 and compute cores 411(N,1)-411(N,K) of N'th compute node 480-N.

At least a part of the compute node memory is a random access memory—being a volatile RAM or a non-volatile RAM.

According to an embodiment, each compute core is a processing circuit, a part of processing circuit, and the like. A compute node may include a merge circuit—for example one or more of compute cores 411(N,1)-411(N,K) is a merge circuit.

According to an embodiment, each compute node includes a compute node (CN) memory such as CN memory 412(1) of first compute node till CN memory 412(N) of the N'th compute node.

The metadata (e.g., pool index) that includes density values of the sorted table chunks and/or the widths of the sorted table chunks may be stored in the CN memories and/or on one or more storage modules of the storage nodes 420.

The processing circuit may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Each compute node 480 interfaces with one or more client devices such as a client devices 460(1)-460(Q) (or an application installed therein) via a network 470, for receiving queries for retrieving content from the partially ordered database.

The storage system 400 also includes M storage nodes 420-1 through 420-M. The compute nodes and the storage nodes communicate using communication fabric 490. M may equal N or may differ from N.

The storage nodes 420 provide the storage and state in the system 400. Each storage node 420 may include a plurality of SSDs, such as SSDs 440, for example storage node 420-1 includes M1 SSDs 440(1)-440(M1). The storage nodes store the partially ordered database in one or more of the storage devices (units).

Any reference to "may be" should also refer to "may not be".

In the foregoing detailed description, numerous specific details are set forth to provide a thorough understanding of the one or more embodiments of the disclosure. However, it will be understood by those skilled in the art that the present one or more embodiments of the disclosure may be practiced without these specific details. In other instances, well-known methods, procedures, and components have not been described in detail so as not to obscure the present one or more embodiments of the disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present one or more embodiments of the disclosure and in order not to obfuscate or distract from the teachings of the present one or more embodiments of the disclosure.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by a system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks, circuit elements, or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather, the scope of the embodiments of the disclosure is defined by the appended claims and equivalents thereof.

We claim:

1. A method for updating a partially ordered database, the method comprises:

obtaining, by a merge circuit, density values of multiple sorted table chunks of the partially ordered database, wherein a density value of each sorted table chunk is indicative of a relationship between a number of populated rows of the sorted table chunk and a width of the sorted table chunk, wherein the width of the sorted table chunk is determined based on (i) values of sort keys of the sorted table chunk, and (ii) a parameter of a distribution of values of sort keys of the partially ordered database;

merging, by the merge circuit, a set of sorted table chunks to provide a new sorted table chunk that includes sort keys of all the sorted table chunks of the set, and exhibits a density value that exceeds a density value of each sorted table chunk of the set; and replacing, in a storage unit of a storage system, the set of sorted table chunks by the new sorted table chunk.

2. The method according to claim 1, wherein each sort key is associated with a row of a table of the partially ordered database and represents values of multiple cells of the row.

3. The method according to claim 1, wherein the partially ordered database further comprises an unsorted table, wherein the method further comprises transferring, in an ordered manner, content of the unsorted table to one or more sorted table chunks of the multiple sorted table chunks.

4. The method according to claim 1, wherein the parameter of the distribution is indicative of a non-uniformity parameter of the distribution.

5. The method according to claim 1, further comprising selecting the set of sorted table chunks out of the multiple sorted table chunks.

6. The method according to claim 5, comprising selecting sorted table chunks of a same density value.

7. The method according to claim 5, comprising selecting sorted table chunks of density values within a single density level of multiple density levels.

8. The method according to claim 5, wherein the selecting is based on (a) density values of the sorted table chunks, and (b) overlaps between sort key ranges associated with the sorted table chunks.

9. The method according to claim 5, further comprising preventing from selecting sorted table chunks having density values that differ from density values of the sorted table chunks of the set by at least a threshold.

10. The method according to claim 5, wherein the selecting is executed by the merge circuit.

11. The method according to claim 5, wherein the selecting is executed by a processor other than the merge circuit.

12. A non-transitory computer readable medium for updating a partially ordered database, the non-transitory computer readable medium stores instructions executable by a processing system for:

obtaining density values of multiple sorted table chunks of the partially ordered database, wherein a density value of each sorted table chunk is indicative of a relationship between a number of populated rows of the sorted table chunk and a width of the sorted table chunk, wherein the width of the sorted table chunk is determined based on (i) values of sort keys of the sorted table chunk, and (ii) a parameter of a distribution of values of sort keys of the partially ordered database;

merging a set of sorted table chunks to provide a new sorted table chunk that includes sort keys of all the sorted table chunks of the set, and exhibits a density value that exceeds a density value of each sorted table chunk of the set; and replacing, in a storage unit of a storage system, the set of sorted table chunks by the new sorted table chunk.

13. The non-transitory computer readable medium according to claim 12, wherein each sort key is associated with a row of a table of the partially ordered database and represents values of multiple cells of the row.

14. The non-transitory computer readable medium according to claim 12, wherein the partially ordered database further comprises an unsorted table, wherein the method further comprises transferring, in an ordered manner, content of the unsorted table to one or more sorted table chunks of the multiple sorted table chunks.

15. The non-transitory computer readable medium according to claim 12, wherein the parameter of the distribution is indicative of a non-uniformity parameter of the distribution.

16. The non-transitory computer readable medium according to claim 12, that further stores instructions executable by the processor for selecting the set of sorted table chunks out of the multiple sorted table chunks.

17. The non-transitory computer readable medium according to claim 16, that further stores instructions executable by the processor for selecting sorted table chunks of a same density value.

18. The non-transitory computer readable medium according to claim 16, that further stores instructions executable by the processor for selecting sorted table chunks of density values within a single density level.

19. The non-transitory computer readable medium according to claim 12, wherein herein the selecting is based on (a) density values of the sorted table chunks, and (b) overlaps between sort key ranges associated with the sorted table chunks.

20. The non-transitory computer readable medium according to claim 12, wherein comprising preventing from selecting sorted table chunks having density values that differ from density values of the sorted table chunks of the set by at least a threshold.

21. A method for updating a partially ordered database, the method comprises:

obtaining density values of sorted table chunks of the partially ordered database, wherein a density value of each sorted table chunk is indicative of sort key values of at least the sorted table chunk, wherein each sort key is associated with a row of a table represented by the partially ordered database and represents values of multiple cells of the row;

merging a set of sorted table chunks to provide a new sorted table chunk that includes sort keys of all the sorted table chunks of the set, and exhibits a density value that exceeds a density value of each sorted table chunk of the set.

* * * * *